(12) United States Patent
Abadi et al.

(10) Patent No.: US 9,934,132 B2
(45) Date of Patent: Apr. 3, 2018

(54) DETERMINING CODE COVERAGE OF AN APPLICATION BY TEST(S)

(71) Applicant: International Business Machines Corporation, Armonk, NY (US)

(72) Inventors: Aharon Abadi, Petach Tikva (IL); Moria Abadi, Petach Tikva (IL); Idan Ben-Harrush, Givat Elah (IL); Samuel Kallner, D.N. Menashe (IL)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 14/840,062

(22) Filed: Aug. 31, 2015

(65) Prior Publication Data
US 2017/0060733 A1  Mar. 2, 2017

(51) Int. Cl.
*G06F 9/44*  (2006.01)
*G06F 11/36*  (2006.01)

(52) U.S. Cl.
CPC ...... *G06F 11/3676* (2013.01); *G06F 11/3684* (2013.01)

(58) Field of Classification Search
CPC .................................................. G06F 11/3664
See application file for complete search history.

(56) References Cited

U.S. PATENT DOCUMENTS

| 8,381,184 | B2 | 2/2013 | Johnson et al. |
| 8,381,194 | B2 | 2/2013 | Wang |
| 8,707,264 | B2 | 4/2014 | Hossain et al. |
| 2005/0120276 | A1* | 6/2005 | Kolawa ............... G06F 11/3684 714/38.1 |
| 2009/0319833 | A1* | 12/2009 | Nir-Buchbinder .. G06F 11/3616 714/38.14 |
| 2011/0010644 | A1* | 1/2011 | Merrill ...................... G06F 8/34 715/762 |
| 2011/0154121 | A1* | 6/2011 | Dern ................... G06F 11/3676 714/38.1 |
| 2012/0221283 | A1* | 8/2012 | Lee ..................... G06F 11/3676 702/119 |
| 2012/0222014 | A1* | 8/2012 | Peretz ................. G06F 11/3688 717/125 |
| 2013/0111267 | A1 | 5/2013 | Beryoza et al. |
| 2014/0040866 | A1 | 2/2014 | Barr et al. |

OTHER PUBLICATIONS

Sangmin Park et al., "CarFast: achieving higher statement coverage faster", FSE '12 Proceedings of the ACM SIGSOFT 20th International Symposium on the Foundations of Software Engineering Article No. 35 , 2012.

* cited by examiner

*Primary Examiner* — Hang Pan

(57) ABSTRACT

A method of determining code coverage of an application by test(s) (wherein code may include UI elements). The method comprises executing a code test on at least one portion of a tested code of an application in one or more iterations, wherein in each one of the plurality of iterations, selecting at least one of a plurality of atomic code elements of the tested code, applying the code test on a version of the code that does not include the at least one selected atomic element, and classifying the at least one selected atomic element as covered by the code test when the code test fails and as not covered in the code test when the code test passes.

18 Claims, 8 Drawing Sheets

Figure 1:
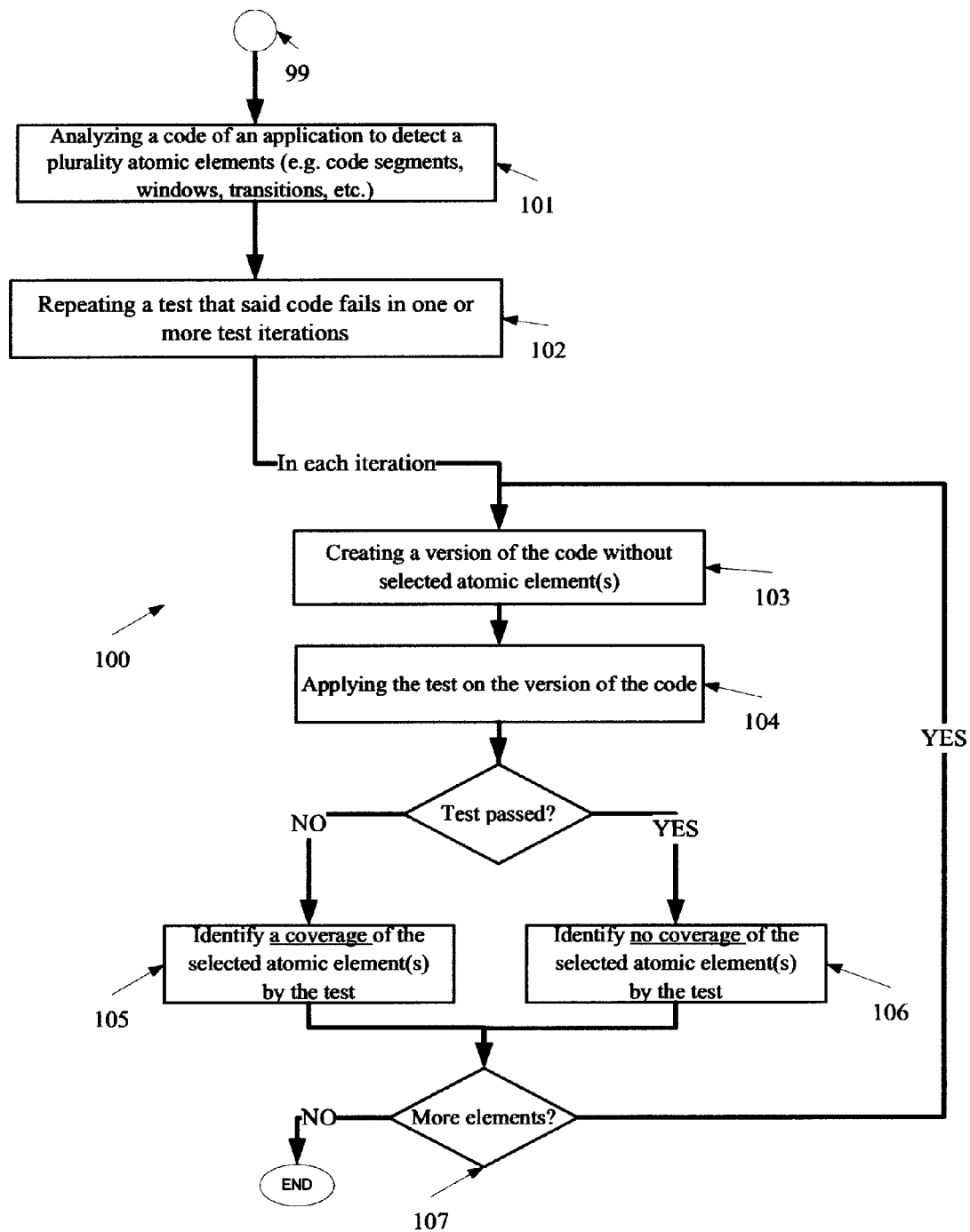

```xml
kY" secondAttribute="bottom" constant="8" id="yWo-hZ-g9D"/>
        <constraint firstItem="ab9-Fl-htJ" firstAttribute="top" secondItem="XjY-h1-A
      </constraints>
    </view>
    <navigationItem key="navigationItem" title="Account" id="wg9-LC-wzD">
      <barButtonItem key="rightBarButtonItem" title="Sign Out" id="Zg7-2y-o0x">
        <connections>
          <action selector="signOut:" destination="bnu-9J-8Va" id="bSg-H6-Rnc"/>
        </connections>
      </barButtonItem>
    </navigationItem>
    <connections>
      <outlet property="loadingImageSpinner" destination="vS7-nu-9U0" id="GKG-Ky-Gal"/>
      <outlet property="logo" destination="Gvc-V5-3CS" id="1SQ-u6-Yf5"/>
      <outlet property="signedInLabel" destination="pdL-gw-wUN" id="HRh-6m-5sM"/>
      <outlet property="userEmail" destination="1OJ-sN-f2x" id="gyW-f9-ekL"/>
      <outlet property="userName" destination="ab9-Fl-htJ" id="7yU-du-g9H"/>
      <outlet property="userProfilePic" destination="XjY-h1-AkY" id="gJT-3x-TX4"/>
    </connections>
  </viewController>
```

FIG. 3

```
NSNotificationCenter.defaultCenter().addObserver(self,
    selector: "onContentSizeChange:", name:
    UIContentSizeCategoryDidChangeNotification, object: nil)
} override func viewDidDisappear(animated: Bool){
    super.viewDidDisappear(animated)
    NSNotificationCenter.defaultCenter().removeObserver(self)
}

@objc private func onContentSizeChange(notification:
    NSNotification){
    configureFonts()
} func configureFonts(){
    userName.font = UIFont.preferredFontForTextStyle
        (UIFontTextStyleHeadline)
    userEmail.font = UIFont.preferredFontForTextStyle
        (UIFontTextStyleSubheadline)
}

@IBAction func signOut(sender: AnyObject) {
    Log("Signing out...")
    User.sharedInstance.signOut()
    if let mainTabBarController = tabBarController as?
        MainTabBarController {
        mainTabBarController.openLoginController()
    }
}
```

FIG. 4

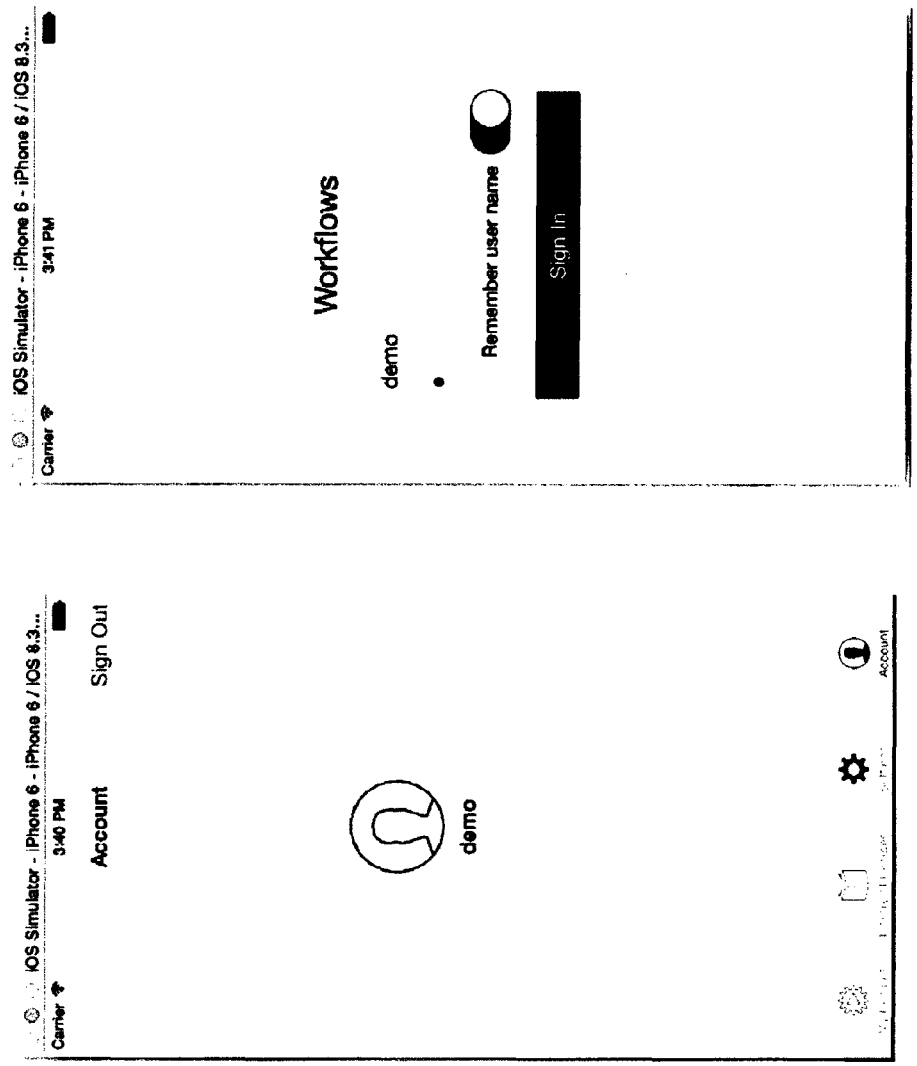

```
<action selector="signOut:" destination="bnu-9J-0Va" id="bSg-H6-Rnc"/>
```

FIG. 7

```
kY" secondAttribute="bottom" constant="8" id="yWo-hZ-g9D"/>
            <constraint firstItem="ab9-Fl-htJ" firstAttribute="top" secondItem="XjY-hI-A
        </constraints>
    </view>
    <navigationItem key="navigationItem" title="Account" id="ug9-LC-wzD">
        <barButtonItem key="rightBarButtonItem" title="Sign Out" id="Zg7-2y-o0x">
            <connections>
                <!/connections>
        </barButtonItem>
    </navigationItem>
    <connections>
        <outlet property="loadingImageSpinner" destination="vS7-nu-9U0" id="GKG-Ky-Ga1"/
        <outlet property="logo" destination="Gvc-V5-3CS" id="1SO-u6-Y15"/>
        <outlet property="signedInLabel" destination="pdL-gw-wUN" id="H8h-6m-SsM"/>
        <outlet property="userEmail" destination="lOJ-sN-f2x" id="gyW-f9-ekL"/>
        <outlet property="userName" destination="ab9-Fl-htJ" id="7yU-du-g9H"/>
        <outlet property="userProfilePic" destination="XjY-hI-AkY" id="gJT-3x-TX4"/>
    </connections>
</viewController>
```

FIG. 8

FIG. 9

```
- (void)testSave {
    XCTestExpectation *createResponseExpectation = [self expectationWithDescription:@"First Save Response"];
    XCTestExpectation *changeResponseExpectation = [self expectationWithDescription:@"Second Save Response"];

WFLManager *manager = [[WFLManager alloc] initWithApp: @"WFLRecipeTests" withUserId:@"demo"];

// Test saving a new recipe
    WFLRecipe *recipe = [manager createRecipeWithName: @"TestingRecipes" ofClass:@"template" ownedBy:@"demo"];

[recipe save: ^(NSError * error) {
        if (!error) {
            NSLog(@"Saved a new recipe with id: %@", recipe.itemId);
            // Test changing an existing recipe
            recipe.itemDescription = @"This a test, for the next 60 seconds....";
            [recipe save:^(NSError* error) {
                if (!error) {
                    NSLog(@"Saved existing recipe with id: %@\n", recipe.itemId);
                }
                else {
                    NSLog(@"Error saving! (%@)\n", error);
                }
                [changeResponseExpectation fulfill];
            }];

}
        else {
            NSLog(@"Error saving! (%@)\n", error);
        }
        [createResponseExpectation fulfill];
    }];

[self waitForExpectationsWithTimeout:60 handler:^(NSError *error) {
        if (error) {
            NSLog(@"WFLRecipe save recipes error. Error: %@", error.description);
        }
    }];
}
```

FIG. 10

```
- (void) testSaveOverride: (WFLCompletionHandler) onComplete {
    NSLog(@"In the override for save");
    onComplete(nil);
}

- (void)testSave {
    XCTestExpectation *createResponseExpectation = [self expectationWithDescription:@"First Save Response"];
    XCTestExpectation *changeResponseExpectation = [self expectationWithDescription:@"Second Save Response"];

WFLManager *manager = [[WFLManager alloc] initWithApp: @"WFLRecipeTests" withUserId:@"demo"];

// Test saving a new recipe
    WFLRecipe *recipe = [manager createRecipeWithName: @"TestingRecipes" ofClass:@"template" ownedBy:@"demo"];

Class class = [self class];

SEL originalSelector = @selector(save:);
    SEL swizzledSelector = @selector(testSaveOverride:);

Method originalMethod = class_getInstanceMethod([recipe class], originalSelector);
    Method swizzledMethod = class_getInstanceMethod(class, swizzledSelector);

BOOL didAddMethod =
        class_addMethod([recipe class],
                        originalSelector,
                        method_getImplementation(swizzledMethod),
                        method_getTypeEncoding(swizzledMethod));

if (didAddMethod) {
        class_replaceMethod([recipe class],
                            swizzledSelector,
                            method_getImplementation(originalMethod),
                            method_getTypeEncoding(originalMethod));
    }
    else {
        NSLog(@"Swizzle failed");
    }

[recipe save: ^(NSError * error) {
        if (!error) {
            NSLog(@"Saved a new recipe with id: %@", recipe.itemId);
            // Test changing an existing recipe
            recipe.itemDescription = @"This a test, for the next 60 seconds....";
            [recipe save:^(NSError* error) {
```

FIG. 11

DETERMINING CODE COVERAGE OF AN APPLICATION BY TEST(S)

FIELD AND BACKGROUND OF THE INVENTION

The present invention, in some embodiments thereof, relates to code testing and, more specifically, but not exclusively, to code coverage techniques.

Application code has become increasingly complex, and as complexity has increased so has a need to perform application testing. Application testing allows one to determine, among other things, whether an application's code has proper functionality.

Technicians and programmers wish to test effectiveness of an application testing program or system try to assure that full code coverage by determining which portions of an application's code are being executed during tests against the application. Code coverage techniques are increasingly used to assess effectiveness of application testing. Code coverage involves determining which portions of an application's code are executed when an application is subjected to testing. Path tracing is performed by recording instructions that are being executed by the tested application. Test effectiveness is typically measured in ratio or percentage of a number of instructions executed during the test to a total number of instructions present in the application. As an example, a test may be regarded as moderately effective where 70 instructions are executed in an application that comprises 100 instructions.

Existing code coverage instrumentation and reporting tools, typically used by application developers and quality assurance professional to test effectiveness of their application testing methodologies, for example, inject external stored procedure calls as executable statements into the application code.

SUMMARY OF THE INVENTION

According to some embodiments of the present invention, there is provided a method for determining code coverage of an application by test(s). The method comprises: executing a code test on at least one portion of a tested code of an application in one or more iterations, wherein in each one of the one or more iterations: selecting at least one of a plurality of atomic code elements of the tested code, applying the code test on a version of the code that does not include the at least one selected atomic element, and classifying the at least one selected atomic element as covered by the code test when the code test fails and as not covered in the code test when the code test passes.

Optionally, the method further comprises analyzing the tested code to detect a plurality of atomic code elements of the tested code.

Optionally, each of at least some of the plurality of atomic code elements comprises one or more code fractions with code instructions to generate a certain screen or a window of the application.

Optionally, each of at least some of the plurality of atomic code elements comprises one or more code fractions of interactive elements with code instructions to generate a graphical user interface (GUI) element.

Optionally, each of at least some of the plurality of atomic code elements comprises one or more code fractions of interactive elements with code instructions to generate an input field.

Optionally, each of at least some of the plurality of atomic code elements comprises one or more code fractions of interactive elements with code instructions to generate media display tool of a certain screen or a window of the application.

Optionally, each of at least some of the plurality of atomic code elements comprises one or more code fractions with code instructions to execute a transition between screens or windows of the application.

Optionally, each of at least some of the plurality of atomic code elements comprises one or more code fractions of elements with code instructions to generate application events of the application.

Optionally, each one of the plurality of atomic code elements comprises code fraction having code instructions encoded in a programming language.

Optionally, each one of the plurality of atomic code elements comprises code instructions having an event handler.

Optionally, each one of the plurality of atomic code elements comprises code instructions having a screen initialization code.

Optionally, the applying the code test on a version comprises generating the version by disabling at least one function in the at least one selected atomic element.

Optionally, the applying the code test on a version comprises generating the version by generating a copy of the tested code without the at least one selected atomic element.

Optionally, the applying the code test on a version comprises blocking at least one event defined in the at least one selected atomic element.

Optionally, the applying the code test on a version comprises instructing a module executing the code test to ignore the at least one selected atomic element.

Optionally, the one or more iterations comprise a plurality of iterations.

According to some embodiments of the present invention, there is provided a system for determining code coverage of an application by test(s). The system comprises an interface adapted to receive a tested code and a code test, a memory storing a code coverage test code, at least one processor for executing the code coverage test code for executing, code instructions for executing the code test on at least one portion of the tested code in one or more iterations, wherein in each one of the one or more iterations: selecting at least one of a plurality of atomic code elements of the tested code, applying the code test on a version of the code that does not include the at least one selected atomic element, and classifying the at least one selected atomic element as covered by the code test when the code test fails and as not covered in the code test when the code test passes.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
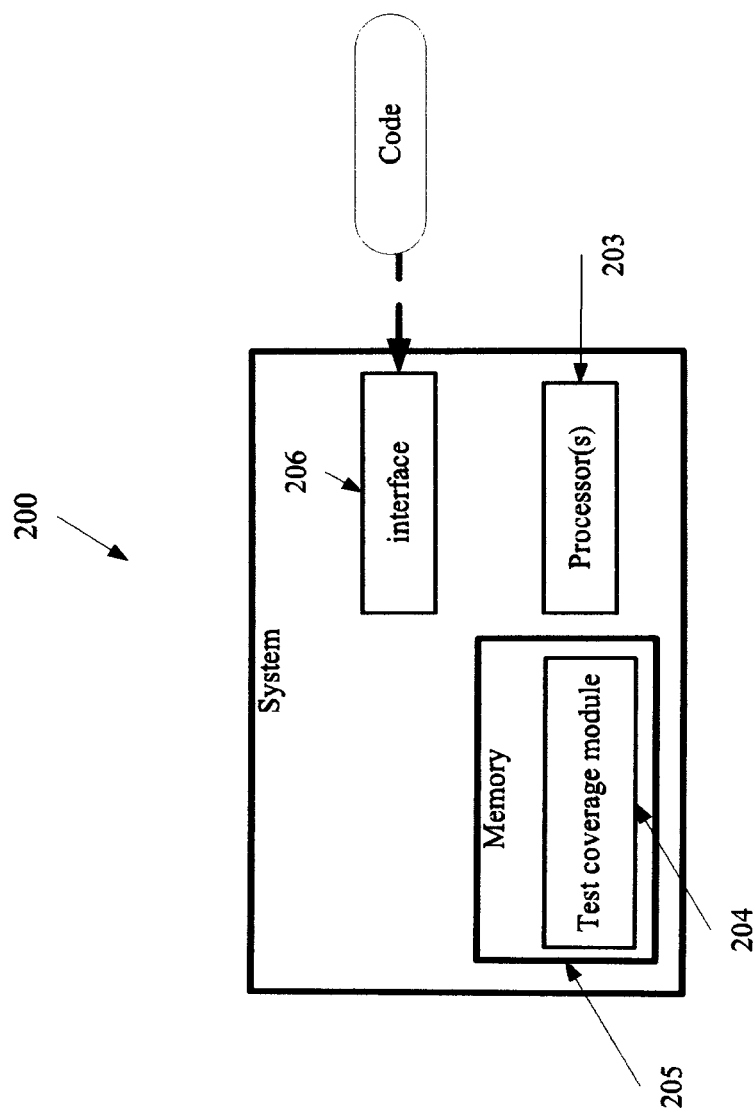

In the drawings:

FIG. 1 is a flowchart of a method of identifying code elements uncovered by a code test by iteratively testing versions of a tested code, according to some embodiments of the present invention;

FIG. 2 which is a schematic illustration of a system of identifying code elements uncovered by a code test applied to a tested code by iteratively testing different versions of the tested code, according to some embodiments of the present invention;

FIGS. 3, 4, 5, 6, 7, 8 and 9 are exemplary code portions and exemplary screens of the exemplary application; and FIGS. 10 and 11 are respectively code examples of a code portion and a version of the code portion with a disabled function generated according to some embodiments of the present invention.

DESCRIPTION OF SPECIFIC EMBODIMENTS OF THE INVENTION

The present invention, in some embodiments thereof, relates to code testing and, more specifically, but not exclusively, to code coverage techniques.

According to some embodiments of the present invention, there are provided methods and systems of determining code coverage of an application by test(s) by iteratively testing versions of a tested code, wherein in each version different atomic code elements are disabled. This methods and systems allows identifying which of the versions lead the code test to fail and which of the versions lead the code test to pass and to classify the respective missing atomic code elements (e.g. temporarily removed, deleted, ignored, edited, and/or otherwise disabled atomic code elements in the versions) accordingly.

The atomic code elements may be code fractions of application screens, transactions between application screens, graphical user interface elements, events and/or the like. The versions may be generated by automatically instructing a testing module and/or by automatically creating edited copies of the tested code.

This methods and systems improve the efficiency of a test coverage procedure and may be applied without requiring an adaptation of the code test and/or the tested code, reducing computational efficiency of the test coverage procedure and the general effort which is required for testing the coverage of code tests for tested codes of applications, for example iOS or android applications.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a flowchart of a method of identifying code elements uncovered by a code test by iteratively testing versions of a tested code from which code elements have been sequentially removed, and classifying a coverage of the removed code element(s) according to the outcome according to outcome of the test in a respective iteration, according to some embodiments of the present invention. The code may be as a programming language code. As used herein a programming language is a formal constructed language designed to communicate human instructions to a machine, particularly a computer (e.g. used to control a behavior of a machine or to express algorithms). As used herein a test or a code test may refer to one or more code tests. The method allows reducing the needed computational efforts and human involvement which are required for code test coverage analysis. The reduction in the computational efforts is an outcome of removing the need to execute path tracing or applying numerous application usage permutations. It should be noted that the tested code may be of various operating systems, such as iOS, Android operating systems, and Windows and/or Linux operating systems.

Reference is also made to FIG. 2 which is a schematic illustration of a system 200 of identifying code elements uncovered by a code test applied to a tested code by iteratively testing different versions of the tested code each without different code element(s) from the tested code and classifying a coverage of each of the removed code element(s) by the code test according to outcome of the code test in the respective iteration, according to some embodiments of the present invention. The system 200 is optionally implemented on a computing unit, such as a computer, server, virtual machine and/or the like. The system 200 includes one or more processors 203 which execute a test coverage module 204 stored in a memory 205. The memory may be local or remote to the system 200. The system 200 further includes an interface 206 for receiving a tested code and a code test for testing the tested code. The interface may include a graphical user interface that allows a user to upload the tested code and the code test. The interface may be a network for receiving the tested code and the code test from a remote client or database, for instance via a network.

As shown at 99, a tested code (or a portion thereof) and a code test are designated, for example using a GUI such as a GUI of an integrated development environment (IDE), a source code editor, build automation tool and/or a debugger. The designation may be done by loading and/or selecting file(s) comprising the tested code and the code test.

As shown at 101, plurality of atomic code elements in the tested code (or in a portion thereof), for instance a tested code of a mobile application, such as an App store or a Play store application, are detected and optionally parsed and/or tagged. For brevity a tested code and a portion of a tested code are referred to herein as a tested code.

Optionally, an atomic element is a code fraction, also referred to as a code fraction. The code fraction may be continuous as a monolithic code unit or distributed in the tested code in a number of continuous segments. The code fraction may be related to a visual application feature, for instance:

one or more code fractions with code instructions to generate a certain screen or a window of an application, one or more code fractions of interactive elements with code instructions to generate GUI elements, fields, and/or media display of a certain screen or a window of an application, one or more code fractions with code instructions to execute a transition between certain screens or windows of an application and/or elements related to such a transition, and one or more code fractions of elements with code instructions to generate application events, such as a location based event, a user input event, a game progress event, a time based event and/or the like, one or more code fractions of a condition statement of a code fraction.

Code fraction may be identified using various code analysis schemes, optionally based on tagging from an IDE tool, function or variable names, presence of function calls and/or the like.

Now, as shown at 102, the test code is applied in derivatives of the tested code in a plurality of iteration. Optionally, in each iteration the test code is applied on another of a plurality of versions of the tested code wherein in each version another of the atomic code elements is deleted, disabled, or otherwise removed from the process of applying the test code on the version, for instance from a compilation of the version and/or from a review by a source code testing process. It should be noted that the code test may include a plurality of sub-code tests. A version of the tested code is optionally created by generating a temporal copy of the tested code without one or more of the atomic code elements, temporarily disabling one or more of the atomic code elements in the tested code, temporarily editing one or more of the atomic code elements, temporarily deleting one or more of the atomic code elements, and/or the like.

For example, in each one of the iterations, as shown at 103, a version of the tested code without one or more selected atomic code elements is created or defined, for example by executing the test coverage module 204. Optionally, the new version is a new edited copy of the tested code. Additionally or alternatively, the new version is defined by providing test executing module instructions to the test coverage module 204 to ignore one or more atomic code elements in the respective iteration. Optionally, the versions are created by sequentially selecting atomic element(s) for removal, either one by one or in groups. Optionally, the atomic code elements sequentially removed, each in one of the iterations.

Optionally, various modules or logic may be provided to disable different types of atomic code elements. For example, in order to remove an event, an event blocker module that blocks events is used. In another example, screens are iteratively block wherein each screen is blocked removing all the transitions to the respective screen in the tested code and/or connecting a predecessor screen to a successor screen.

Now, in the respective iteration, as shown at 104, the test is applied on the created version.

Based on the outcome, the selected atomic code elements are classified as covered by the test or not covered by the test. For example, as shown at 105 when the test failed in one of the iterations it is determined that the coverage of the test covers the selected atomic code elements. As shown art 106, when the test does not fail, optionally although the test failed the preceding iteration, it is determined that the coverage of the test does not cover the selected atomic code elements.

As shown at 107, the process repeats as long as not all the atomic code elements have been removed, optionally at least once. Optionally a code element removed in one of the iterations is added to the following iteration(s). In such embodiments an atomic code element is removed only in a respective test iteration.

It should be noted that the process 100 and the system 200 described above solve the problem of testing a code coverage of an application by test(s) without having to change the tested code, for example by injecting external stored procedure calls as executable statements into the application code. This reduces the risk of changing the code and the required computational and human effort which is involved in analyzing the executable statements. Moreover, the process 100 and the system 200 may allow automatically identifying code coverage without any change to the test itself. Furthermore, a number of test codes can be executed in this process, reducing the computational effort which is required to run each one of the test codes separately.

In an exemplary implementation:

T denotes a set of tests for a code of a mobile application, $S_1 \ldots S_n$ denote screens of an application with interactive elements such as buttons, check-boxes, text-fields and/or the like, $T_1 \ldots T_k$ denote transitions between the screens $S_1, \ldots, S_n$, $e_1 \ldots e_j$ denote a set of all possible events of the application, and $f_1 \ldots f_t$ denote all code fractions that include: event handlers, screens' initialization code, native and web code, and/or the like. The fractions of code contain programming language statements.

In order to check whether the application code is covered by T, atomic code elements are iteratively removed or marked as removed from the application code (in each iteration another atomic element is disabled or removed) and T is applied on a version of the application code wherein the removed atomic element is disabled or missing. It is assumed that the atomic element removed or marked as removed is not covered by T when T will not fail when it is applied on the version.

Optionally, code fractions may be identified according to elements defined by an IDE supporting tool, such as a storyboard generator, for example a GUI element such as a button, a bar, and/or the like. For example, reference is now made to an exemplary iteration wherein an atomic element of a tested code of an exemplary application, an iOS™ application, fails a code test and classified as covered by the code test. For clarification of this example reference is also made to FIGS. 3, 4, 5, 6, 7, 8 and 9 which are exemplary code portions and exemplary screens of the exemplary application.

When developing an application for iOS (i.e. an iPhone or an iPad) a programmer may build parts of a user interface (UI) by defining a declarative UI, optionally using storyboards, for instance by describing which elements are needed and to some degree how they should look like without providing details about the exact position and visual style of the elements. A declarative UI may define an input field without specifying how and where this field is placed at the UI. The used storyboards may be from XCode IDE of Apple™ for MacOS™ and/or iOS™ development. These storyboards are used to build the UI by placing widgets on the screen. These widgets may be configured with color, labels, size, and/or the like. In addition, a storyboard may connect widgets with code that resides in one or more View Controllers. A View controller is a class that extends the UIViewController class supplied by the Apple UI framework.

Optionally, the tested code of the iOS application is associated with a storyboard stored as an Extensible Markup Language (XML) file. The storyboard is optionally used for identifying code fraction(s) related to an element in a screen. For example, the dashed line in FIG. 3 encircles a code fraction associated with a storyboard element defining a button on a tab bar. The button is labeled "Sign Out" and is connected to the function signOut. FIG. 4 is a screenshot a screen of the XCode IDE showing the button to left and a respective code fraction to the right (encircled with dashed line. When the user clicks sign out the screen changes, for instance from the screen depicted in FIG. 5 to the screen depicted in FIG. 6. and the message "Sign out . . . " is printed in a log.

Figure 9:
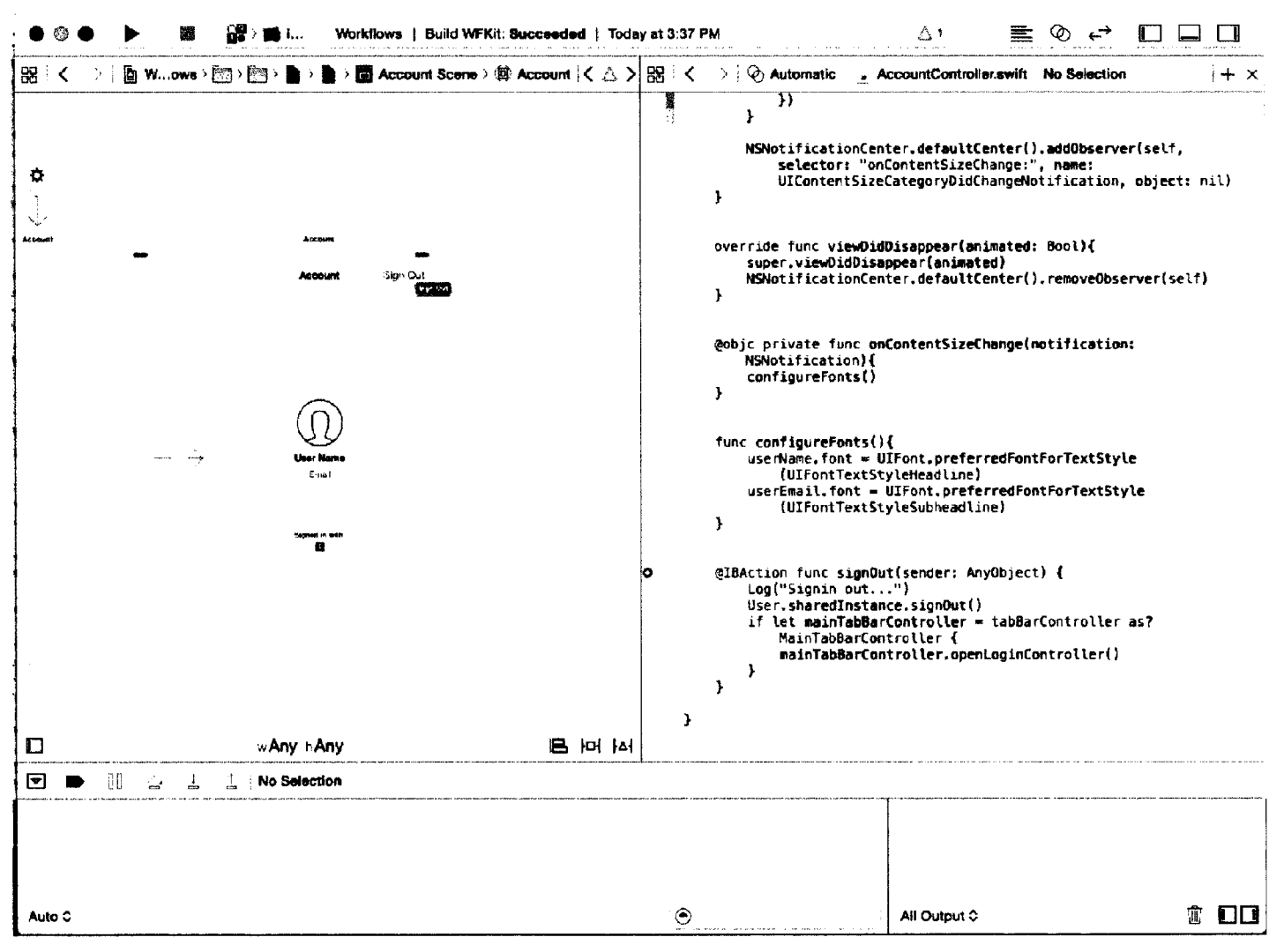

In one of the iterations of the process described above, the respective code fraction is removed from the tested code. For example the code fraction depicted in FIG. 7 is removed forming a version of the code depicted in FIG. 3, as depicted in FIG. 8. FIG. 9 shows that a connection has been broken by this deletion. As this deletion will cause the respective code test to fail, the process classifies the code fraction depicted in FIG. 7 as covered.

As described above, code fractions may be disabled. The disabling may be performed by disabling functions. For example, FIGS. 10 and 11 are respectively code examples of a code portion and a version of the code portion with a disabled function. In the depicted code portions the function testSave is disabled by changing the implementation of an existing selector (in this example iOS swizzle).

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant units and processes will be developed and the scope of the term a code, a test, and a processor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for determining code coverage of an application by test(s), comprising:
   executing, by at least one processor, a test for code testing, on at least one portion of a code under test of an application in a plurality of iterations, wherein in each one of said plurality of iterations:
   selecting, by said at least one processor, at least one of a plurality of atomic code elements of said code under test,
   creating, by said at least one processor, a version of said code under test that does not include said at least one selected atomic element,
   testing, by said at least one processor, said version by executing said test on said version,
   determining, by said at least one processor, whether said version passes or fails said testing by said test, and
   classifying, by said at least one processor, said at least one selected atomic element as covered by said test when said test fails when testing said version and as not covered by said test when said test passes when testing said version;

wherein an effort of said executing is reduced by that that said testing in each of said plurality of iterations is conducted without changing said test.

2. The method of claim 1, further comprising analyzing said code under test to detect a plurality of atomic code elements of said code under test.

3. The method of claim 1, wherein each of at least some of said plurality of atomic code elements comprises one or more code fractions with code instructions to generate a certain screen or a window of said application.

4. The method of claim 1, wherein each of at least some of said plurality of atomic code elements comprises one or more code fractions of interactive elements with code instructions to generate a graphical user interface (GUI) element.

5. The method of claim 1, wherein each of at least some of said plurality of atomic code elements comprises one or more code fractions of interactive elements with code instructions to generate an input field.

6. The method of claim 1, wherein each of at least some of said plurality of atomic code elements comprises one or more code fractions of interactive elements with code instructions to generate media display tool of a certain screen or a window of said application.

7. The method of claim 1, wherein each of at least some of said plurality of atomic code elements comprises one or more code fractions with code instructions to execute a transition between screens or windows of said application.

8. The method of claim 1, wherein each of at least some of said plurality of atomic code elements comprises one or more code fractions of elements with code instructions to generate application events of said application.

9. The method of claim 1, wherein each one of said plurality of atomic code elements comprises code fraction having code instructions encoded in a programming language.

10. The method of claim 1, wherein each one of said plurality of atomic code elements comprises code instructions having an event handler.

11. The method of claim 1, wherein each one of said plurality of atomic code elements comprises code instructions having a screen initialization code.

12. The method of claim 1, wherein said creating said version comprises generating said version by disabling at least one function in said at least one selected atomic element.

13. The method of claim 1, wherein said creating said version comprises generating said version by generating a copy of said code under test without said at least one selected atomic element.

14. The method of claim 1, wherein said executing said test on said version comprises blocking at least one event defined in said at least one selected atomic element.

15. The method of claim 1, wherein said executing said test on said version comprises instructing a module executing said test to ignore said at least one selected atomic element.

16. A non-transitory computer readable medium comprising computer executable instructions adapted to perform the method of claim 1.

17. A system for determining code coverage of an application by test(s), comprising:

an interface adapted to receive a code under test and a test for code testing;
a memory storing a code coverage test code;
at least one processor for executing said code coverage test code for executing;
code instructions for executing said test on at least one portion of said code under test in a plurality of iterations, wherein in each one of said plurality of iterations:
selecting at least one of a plurality of atomic code elements of said code under test,
creating a version of said code under test that does not include said at least one selected atomic element,
testing said version by executing said test on said version,
determining whether said version passes or fails said testing by said test, and
classifying said at least one selected atomic element as covered by said test when said test fails when testing said version and as not covered by said test when said testing code passes when testing said version;
wherein an effort of said executing is reduced by that that said testing in each of said plurality of iterations is conducted without changing said test.

18. A computer program product for determining code coverage of an application by test(s), the computer program product comprising a non transitory computer readable storage medium having program instructions embodied therewith, the program instructions executable by at least one processor to cause a computing device to:

execute by said at least one processor a test for code testing, on at least one portion of a code under test of an application in a plurality of iterations, wherein in each one of said plurality of iterations said at least one processor executes instructions for:
selecting at least one of a plurality of atomic code elements of said code under test,
creating a version of said code under test that does not include said at least one selected atomic element,
testing said version by executing said test on said version,
determining whether said version passes or fails said testing by said test, and
classifying said at least one selected atomic element as covered by said test when said test fails when testing said version and as not covered by said test when said testing code passes when testing said version;
wherein an effort of said execution is reduced by that that said testing in each of said plurality of iterations is conducted without changing said test.

* * * * *